United States Patent [19]

Liberti et al.

[11] Patent Number: 4,477,355
[45] Date of Patent: Oct. 16, 1984

[54] METHOD FOR REMOVING AND RECOVERING NUTRIENTS FROM WASTEWATER

[76] Inventors: Lorenzo Liberti, via Auricarro 113/9; Gianfranco Boari, via Auricarro 113/10, both of 70027 Palo del Colle (BA); Roberto Passino, via F. Ferrara 8, 00191 Roma, all of Italy

[21] Appl. No.: 480,526

[22] Filed: Mar. 30, 1983

[30] Foreign Application Priority Data

Jan. 14, 1983 [IT] Italy ............................. 47563 A/83

[51] Int. Cl.³ .............................................. C02F 1/42
[52] U.S. Cl. ..................................... 210/665; 210/677; 210/685; 210/724; 210/906; 423/157; 423/181
[58] Field of Search ............... 210/724, 672, 665, 685, 210/712, 906; 423/305, 306, 158, 181

[56] References Cited

U.S. PATENT DOCUMENTS

| | | | |
|---|---|---|---|
| 3,042,606 | 5/1960 | Salutsky et al. | 210/665 |
| 3,163,599 | 1/1963 | Salutsky et al. | 210/697 |
| 3,195,978 | 7/1965 | Dunseth et al. | 423/181 |
| 3,363,975 | 1/1968 | Dunseth et al. | 423/186 |
| 3,579,322 | 5/1971 | Higgins | 210/685 |
| 3,723,308 | 3/1973 | Breck | 210/681 |
| 3,984,313 | 10/1976 | Higgins | 210/906 |

FOREIGN PATENT DOCUMENTS

| | | | |
|---|---|---|---|
| 0074568 | 6/1977 | Japan | 210/685 |
| 188897 | 11/1956 | Sweden | 210/906 |

Primary Examiner—Benoît Castel
Assistant Examiner—K. Hodson
Attorney, Agent, or Firm—Townsend and Townsend

[57] ABSTRACT

A method for removing and recovering ammonium and/or potassium and/or phosphate ions from wastewater is presented which comprises:

permitting said wastewater to pass through at least one bed of ion-exchange resins capable of removing selectively those nutrient ions regenerating those ion-exchange resins with a Na Cl solution or other suitable regenerant solutions so that said nutrient ions may be obtained in a much more concentrated form adding to said regeneration eluates (or, eventually, directly to wastewater) at least one Mg salt, in proper pH conditions so as to precipitate hydrous $MgNH_4PO_4$ and/or $MgKPO_4$, slightly soluble salts of great agronomic value.

6 Claims, 2 Drawing Figures

METHOD FOR REMOVING AND RECOVERING NUTRIENTS FROM WASTEWATER

BACKGROUND AND SUMMARY OF THE INVENTION

The present invention relates to a method for removing 20 nutrient species such as ammonium and/or potassium and/or phosphate ions from wastewater which contains appreciable amounts of these species so that eutrophication and similar undesired effects related to the discharge of said species may be prevented.

Furthermore said nutrient species are recovered in form of the agronomically valuable slightly soluble hydrous salts $MgNH_4PO_4$ and/or $MgKPO_4$ by a precipitation technique, applied either directly to the wastewater or to the eluate solution obtained after said wastewater has been treated with suitable ion-exchange resins. According to the present invention, not only the serious pollution problems are associated to the discharge of nutrients prevented, but also one or more salts of great interest as fertilizer are recovered, the value of which may cover, at least partially, the cost of the treatment process.

Appreciable concentration of ammonium and/or potassium and/or phosphate ions may be often found in many wastewaters of industrial, civil or mixed origin, even though treated by conventional biological methods. Sometimes, high concentration of nutrients is found in secondary streams produced during the biological treatment process such as, for instance, in the anaerobic digester supernatant. The presence of these nutrient ions often prevents the discharge or the recycle of said wastewater. Ammonium and, more often, phosphates are usually responsible for well known eutrophication phenomena in the receiving water bodies, so that stringent limitations to the discharge of these ions have been introduced throughout the world. Furthermore, excessive amounts of potassium, as found for instance in wastewater of zootechnical origin or from the production of olive oil, may prevent the recovery as animal feeding of by-products from the purification of said wastewater.

Several methods are actually available to remove N and P species from wastewater. Biological nitrifraction -denitrification is proposed worldwide to convert $NH_4^+$ to $N_2$. Other techniques for ammonia removal applied on a full scale basis, are breakpoint chlorination and atmospheric stripping. Phosphates are ordinarily post-precipitated with lime, alum, iron salts after the biological treatment of wastewater. In very few cases, simultaneous C and P biological removal during wastewater treatment has been reported. None of these methods, however, permits the recovery of the potential agronomic value of these compounds.

On the other hand, slightly soluble ("slow-release") hydrous $MgNH_4PO_4$ and $MgKPO_4$ salts, obtained in common industrial practice from the corresponding pure chemicals, are well-known highly valuable fertilizers, rated "premium quality" in the agronomic literature.

The present invention relates to a method for removing and recovering said ammonium and/or potassium and/or phosphate ions from wastewater which comprises:

permitting said wastewater to pass through at least one bed of ion exchange resin capable of removing selectively those nutrient ions up to the desired level
regenerating those ion-exchange resins with a suitable regenerant solution such as NaCl, so that said nutrient ions may be obtained in a much more concentrated form
adding to said regeneration eluates at least one Mg salt or a mixture thereof so that in proper pH condition hydrous $MgNH_4PO_4$ and/or $MgKPO_4$ slightly soluble salts, of great agronomic value, may be precipitated.

In the case that wastewater contains concentrated amounts of said nutrient species, the corresponding pre-concentration operation through ion exchange resin may be avoided and said nutrient ions may be precipitated directly from wastewater by addition of an Mg salt or mixtures thereof.

More often, an intermediate situation may occur, where the wastewater considered, or even secondary streams of it, contain different concentration of various nutrient ions. This is the case, for instance, of wastewater from pig factory, where concentrations up to 1000 ppm $NH_4$ and 400 ppm K with only 10 ppm P occur; or, similarly, in the complete biological treatment (activated sludge + nitrification/denitrification) of municipal wastewater, where the final effluent still contains 3-10 ppm P and virtually no ammonium, but hundreds ppm of $NH_4$ are still released in the supernatant solution from the anaerobic digestion of sludges.

In such cases the pre-concentration step through ion-exchange resins is applied only to the diluted nutrient ions, while the concentrated species may be precipitated directly as it is from the wastewater.

One may indicate respectively as $<5$ or $>15$ mmol/l the concentration limit for each nutrient species at which pre-concentration through ion exchange is still required or not; in the intermediate range (5-15 mmol/l) proper decision should be checked individually.

Various types of ion-exchange resins may be used for selective removal of said nutrient ions depending on the nature of the wastewater considered.

$NH_4^+$ and $K^+$ cations may be exchanged selectively by some zeolites, either natural (such as clinoptilolite, phillipsite, etc.) or synthetic. Porous, strongly basic organic anion-exchange resins, or even inorganic such as activated alumina, are proved to be useful for phosphate removal from wastewater.

BRIEF DESCRIPTION OF THE DRAWINGS

The accompanying drawings show two embodiments of the invention, in which.

DETAILED DESCRIPTION

The three situations of general occurence previously depicted are better outlined in the following.

Figure 1:
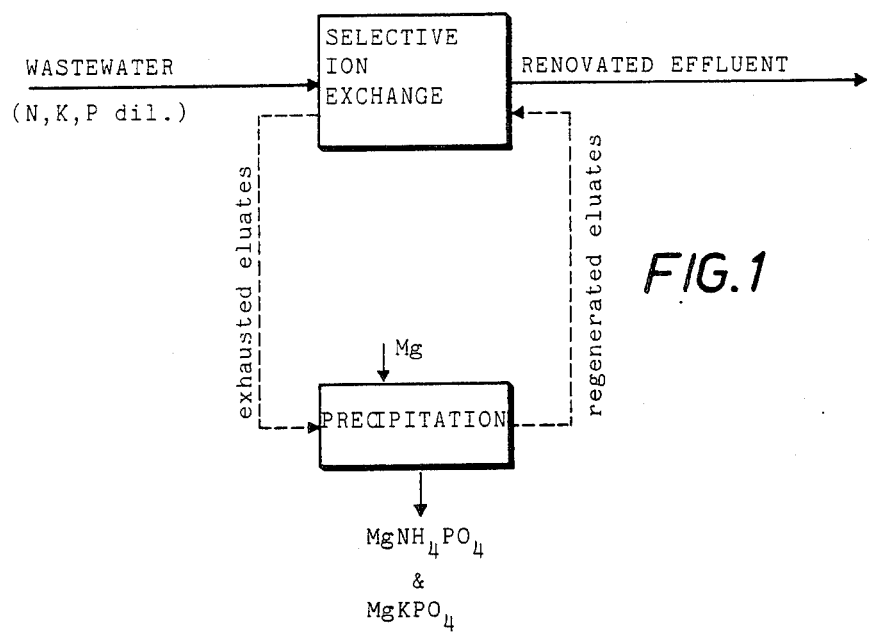
FIG. 1 is a flow diagram for the treatment of civil sewage.

(a) Civil sewage represents the more general case of wastewater containing appreciable concentration of both ammonium and phosphate ions (approx 10-50 ppm $NH_4$ and 3-10 ppm $PO_4$). According to the present invention (see FIG. 1) such a wastewater after having been optionally treated by a primary settling, a biological oxidation with activated sludge and a secondary settling (so to produce the so-called secondary effluent), according to the method of the present invention, is passed first through a cation exchange (e. g., clinoptilolite) in Na form, which exhibits a low affinity toward $Ca^{++}$ and $Mg^{++}$ compared with $NH_4^+$ ions. Ammonium is accordingly picked up preferentially by this resin, which at the same time acts as a filtering media toward the suspended matter present. The effluent then passes in series through an anion exchanger (e. g. a porous, strongly basic organic exchanger with quaternary ammonium exchange groups) in Cl form, which exchanges phosphates with chlorides, and also adsorbs (at least partially) bio-refractant organics and microorganisms present in the aqueous stream.

A final effluent may accordingly be obtained virtually free from nutrients, with a remarkably lower content of suspended matter, soluble organics and microorganisms, so that its final acceptability for discharge is enormously improved.

After exhaustion, ion exchange resins are first backwashed countercurrently and then regenerated by a concentrated NaCl solution (0.6 M NaCl, i. e. at sea water concentration, proves useful for this type of application), which restores their ion exchange capacity, and also desorbs organics and kills almost totally viable microorganisms. Regeneration procedure of the resin beds may be performed either separately or passing in series the same NaCl regenerant through the two ion exchangers if one does not expect precipitation related to hardness to occur in the resin beds. In this latter case (e g., when wastewater hardness is $\geq 200$ ppm $CaCO_3$), eluates from the two ion exchangers are better collected separately. Then first the pH of the cation eluate containing concentrated $NH_4^+$ is raised to approx. 9, using $Na_2CO_3$ (or a similar base), so that precipitation of calcium and metals if present occurs. The regeneration anionic eluate (containing concentrated phosphates) is then mixed with the regeneration cationic eluate and, by further addition of an Mg compound (Mg $Cl_2$, $MgCO_3$, $MgSO_4$, MgO, etc ), at a pH between 8.5 to 9.5 the quantitative and stoichiometric precipitation of $MgNH_4PO_4.6H_2O$ is obtained. After separation of the solid phase (by sedimentation, filtration of similar techniques), the liquid phase may be corrected and eventually recycled for further use for the regeration phase.

If required, phosphate or ammonium ions may be added to obtain the stoichiometric ratios Mg: $NH_4$: $PO_4 = 1: 1: 1$ before the precipitation.

Other techniques may be used to let the reaction between ammonium and phosphate ions in the eluates occur. For instance, ammonia may be transferred from the cationic eluate (by alkali addition to pH $\sim 11$ followed by air stripping) to the anionic eluate with well-known desorption-adsorption gas-liquid procedure, and than the Mg precipitation applied to this latter eluate.

(b) several industrial effluents, such as those from steel, painting fertilizer, zootechnical, olive oil and similar industry, contain high concentration of ammonia ($\geq 500$ ppm $NH_4^+$), phosphate ($\geq 1000$ ppm $PO_4$) or both ions.

Ion exchange pre-concentration is no longer necessary in this case and the precipitation procedure previously described may be directly applied to the sewage. In case $K^+$ ion is still present, a third precipitation step (following the precipitation of hardness and metals plus that of Mg $NH_4PO_4$) may be obtained by further increasing pH to 9-10.5, so that hydrous $MgKPO_4$ does precipitate quantitatively and stoichiometrically. Quite often, however, the residual concentration of $NH_4^+$ or/and phosphate ions in the supernatant solution after solid separation may exceed slightly local discharge limits. Selective ion exchange may accordingly be used as a final polishing for said supernatant solution, following the procedure described in (a), and the concentrated resin regeneration eluates intermittently produced undergo the same precipitation procedure (see FIG. 2).

(c) Other intermediate cases are possible where during the wastewater treatment various streams occur, with different concentration of nutrients. As already stated, such a situation is encountered in the complete biological treatment (activated sludges +nitri /denitrification) of wastewater; here only P is still present in the bio-treated effluent (usually $\leq 10$ ppm P). At the same time, high concentration of ammonium (and phosphates) develops in several by-streams during the digestion of sludges. Accordingly selective ion exchange may be employed just to remove phosphates still present there, while the concentrated eluate obtained from resin regeneration may subsequently be reacted with other concentrated by-streams containing other nutrients to perform the precipitation step.

Experimental results obtained in two applications of this invention are now illustrated.

EXAMPLE NO. 1

After primary settling, anaerobic digestion and secondary settling, a typical effluent from pig factory has the composition shown in Tab. I.

| TYPICAL COMPOSITION OF PIG FACTORY EFFLUENT AFTER ANAEROBIC DIGESTION (mg/l) | |
| --- | --- |
| COD | 400 |
| TOD | 300 |
| $NH_4$ | 570 |
| Ca | 200 |
| K | 390 |
| M-alkalinity | 4000 |
| Cl | 235 |
| $SO_4$ | 106 |
| $P_{tot}$ | 18 |
| pH | 7.5 |

To 1 liter of said effluent first 2 M $Na_2CO_3$ was added up to a pH of approx. 9, obtaining approx. 2 g of a precipitate, shown by chemical analysis to be formed essentially by Ca and heavy metals carbonates. Still mantaining the same pH, 40 mml of $Na_2HPO_4$ and 40 mml of $MgCl_2$ (from their saturated solutions) were then added to the supernatant solution so that a second precipitate (approx. 10 g) was found which chemical analysis showed to be $MgNH_4PO_4.6H_2O$ almost pure. After filtration, the filtrate presented a residual ammonia and phosphate concentration equal to $\leq 2\%$ of their initial value.

Figure 2:
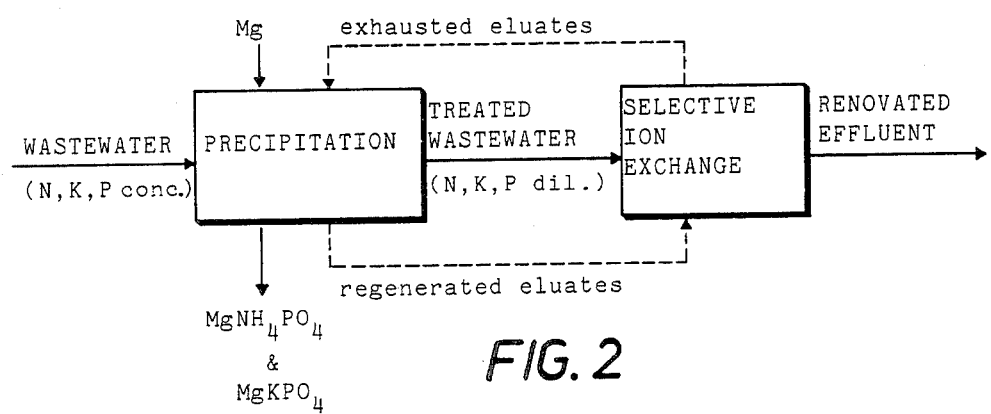
FIG. 2 is a flow diagram for the treatment of a typical effluent from a pig factory.

Then the pH of filtrate was further increased to approx. 9.5 (still using 2 M $Na_2CO_3$) and, by addition of other 13 mml of $Na_2HPO_4$ and 13 mml $MgCl_2$, a third precipitate (approx. 2 g) was obtained, corresponding essentially to hydrous Mg K $PO_4$ salt. Depending on local limits for discharge of $NH_4^+$ and phosphates, the final effluent may be treated or not by ion exchange as described in Example 2 (FIG. 2).

EXAMPLE NO. 2

After primary settling, aerobic bio-oxidation by activated sludge and secondary settling, a typical southern Italian municipal secondary effluent has the composition shown in Tab. II.

| AVERAGE COMPOSITION OF SOUTHERN ITALY CIVIL SECONDARY EFFLUENT (mg/l) | |
| --- | --- |
| Cl | 618 |
| M-alkalinity | 610 |
| SO$_4$ | 72 |
| Phosphates | 19 (as P) |
| NO$_3$ | 21 (as N) |
| NO$_2$ | 0.3 (as N) |
| NH$_4$ | 70 |
| K | 35 |
| Na | 345 |
| Ca | 80 |
| Mg | 97 |
| Suspended solids | 10–20 |
| BOD$_5$ | 8–25 |
| COD | 30–75 |
| Cl$_2$ residue | 0.2–0.5 |
| pH | 7.6 |

Italian acceptability limits are 10 or 0.5 ppm P and 32 or 10 ppm N for discharge into sea or lake respectively, so that a tertiary treatment is further required in similar installations.

Two columns (height 120 cm; volume 250 cm$^3$) were prepared, and filled with a natural zeolite (clinoptilolite) and a porous, strongly basic organic anion resin, in Na and Cl form respectively.

Secondary effluent was then fed downward to the columns in series, at a flow rate of 24 BV/h (BV=volumes of solution for volume of resin). Approx. 80 BV were treated in this manner (exhaustion time approx. 3 h 20'), where the average concentration of both effluents was quite below the acceptability limits.

The exhausted cationic and anionic resins were then regenerated (0.6M NaCl in 40'). A new exhaustion-regeneration cycle could then be started on both resins. The pilot plant was run uninterruptedly for almost 9 months (approx. 1500 cycles, or 120,000 BV treated overall), with an average removal for both nutrients steadily within 85 to 95%. Removal of suspended matter and COD depended on the influent composition, although mean experimental figures obtained range between 40 to 60% for both parameters. Furthermore, intermittent analyses showed that more than 99% removal of colibacteria and streptococchi is possible. Only the head fractions of the two regeneration eluates (which contain 75% of nutrients exchanged) were submitted to the precipitation procedure in each run, according to the procedure described in Example 1. Large crystals of MgNH$_4$PO$_4$.6H$_2$O, highly settleable and easily filtrable, with a chemical purity of approx. 98%, were obtained in each precipitation while a residual concentration of approx. 10 ppm P and 16 ppm NH$_4$ occurred in the filtrate. This, after proper pH and NaCl concentration correction could be recycled for further use.

Although the present invention has been adequately described in the foregoing specification, examples and drawings included therewith, it is readily apparent that a person skilled in the art can change or modify the present invention (e. g., modifying or changing the order and/or the alternative of the selective ion exchange+precipitation procedure) without exceeding the scope and limitations thereof.

What is claimed is:

1. A method for treating wastewater containing at least one member selected from the group consisting of ammonium, potassium and phosphate ions at concentrations below about 15 mmol/l per ion type to recover said ions therefrom, said method comprising:
   (a) passing said wastewater through a cation exchange zeolite resin having affinity for the retention of potassium and ammonium ions in preference over calcium and magnesium ions, to selectively extract potassium and ammonium ions present therein;
   (b) passing the effluent of step (a) through a strongly basic anion exchange resin having quaternary ammonium functional groups, to selectively extract phosphate ions present therein;
   (c) regenerating both said cation exchange resin and said anion exchange resin with neutral aqueous sodium chloride at a concentration of about 0.6 M to produce eluates containing the ions extracted in steps (a) and (b);
   (d) combining said eluates;
   (e) raising the pH of said combined eluates to a value ranging from about 8.5 to about 9.5 and adding thereto a sufficient quantity of at least one member selected from the group consisting of MgCl$_2$, MgCO$_3$, MgO, MgSO$_4$ and MgHPO$_4$ and to bring the relative amounts of Mg:NH$_4$:PO$_4$ to approximately 1:1:1 on a molar basis and thereby precipitate MgNH$_4$PO$_4$ hydrous salt;
   (f) recovering a supernatant from step (e), raising the pH thereof to a value ranging from about 9.5 to about 10.5 and adding thereto a sufficient quantity of at least one member selected from the group consisting of MgCl$_2$, MgCO$_3$, MgO, MgSO$_4$ and MgHPO$_4$ to bring the relative amounts of Mg:K:PO$_4$ to approximately 1:1:1 on a molar basis and thereby precipitate MgKPO$_4$ hydrous salt; and
   (g) recycling supernatents from both steps (e) and (f) to step (c).

2. A method according to claim 1 in which the zeolite resin of step (a) is clinoptilolite.

3. A method according to claim 1 further comprising the step of adding at least one salt selected from ammonium, potassium and phosphate salts to said combined eluates prior to step (e) as necessary to effect the precipitation of substantially all of said ammonium, potassium and phosphate ions in steps (e) and (f).

4. A method for treating wastewater containing at least one member selected from the group consisting of ammonium, potassium and phosphate ions at concentrations above about 15 mmol/l per ion type to recover said ions therefrom, said method comprising:
   (a) raising the pH of said wastewater by the addition of an alkalizing agent to precipitate therefrom hardness components and heavy metals;
   (b) recovering a supernatant from step (a), raising the pH thereof to a value ranging from about 8.5 to about 9.5 by the addition of an alkalizing agent, and adding thereto a sufficient quantity of at least one member selected from the group consisting of MgCl$_2$, MgCO$_3$, MgO, MgSO$_4$ and MgHPO$_4$ to bring the relative amounts of Mg:NH$_4$:PO$_4$ to apprximately 1:1:1 on a molar basis and thereby precipitate MgNH$_4$PO$_4$ hydrous salt;
   (c) recovering a supernatant from step (b), raising the pH thereof to a value ranging from about 9.5 to about 10.5, and adding thereto a sufficient quantity of at least one member selected from the group consisting of MgCl$_2$, MgCO$_3$, MgO, MgSO$_4$ and MgHPO$_4$ to bring the relative amounts of Mg:K:PO$_4$ to approximately 1:1:1 on a molar basis and thereby precipitate MgKPO$_4$ hydrous salt;

(d) recovering a supernatant from step (c), and passing said supernatant through a cation exchange zeolite resin having affinity for the retention of potassium and ammonium ions in preference over calcium and magnesium ions, to selectively extract potassium and magnesium ions present therein;

(e) passing the effluent of step (d) through a strongly basic anion exchange resin having quaternary ammonium functional groups, to selectively extract phosphate ions present therein;

(f) regenerating both said cation exchange resin and said anion exchange resin with neutral aqueous sodium chloride at a concentration of about 0.6M to produce eluates containing the ions extracted in steps (d) and (e);

(g) combining said eluates;

(h) raising the pH of said combined eluates to a value ranging from about 8.5 to about 9.5 and adding thereto a sufficient quantity of at least one member selected from the group consisting of MgCl$_2$, MgCO$_3$, MgO, MgSO$_4$ and MgHPO$_4$ to bring the relative amounts of Mg:NH$_4$:PO$_4$ to approximately 1:1:1 on a molar basis and thereby precipitate MgNH$_4$PO$_4$ hydrous salt;

(i) recovering a supernatant from step (h), raising the pH thereof to a value ranging from 9.5 to about 10.5 and adding thereto a sufficient quantity of at least one member selected from the group consisting of MgCl$_4$, MgCO$_3$, MgO, MgSO$_4$ and MgHPO$_4$ to bring the relative amounts of Mg:K:PO$_4$ to approximately 1:1:1 on a molar basis and thereby precipitate MgKPO$_4$ hydrous salt; and (j) recycling supernatants from both steps (h) and (i) to step (f).

5. A method according to claim 4 in which the zeolite resin of step (d) is clinoptilolite.

6. A method according to claim 4 further comprising the step of adding at least one salt selected from ammonium, potassium and phosphate salts to said wastewater prior to step (b) as necessary to effect the precipitation of substantially all of said ammonium, potassium and phosphate ions in steps (b), (c), (h) and (i).

* * * * *